US007856378B2

(12) United States Patent
Mashinsky et al.

(10) Patent No.: US 7,856,378 B2
(45) Date of Patent: Dec. 21, 2010

(54) METHOD AND SYSTEM FOR FACILITATING TRADING OF MEDIA SPACE

(75) Inventors: Alex Mashinsky, New York, NY (US); Judah Levine, Bethesda, MD (US)

(73) Assignee: Arbinet-thexchange, Inc., New York, NY (US)

( * ) Notice: Subject to any disclaimer, the term of this patent is extended or adjusted under 35 U.S.C. 154(b) by 1252 days.

(21) Appl. No.: 10/014,103

(22) Filed: Dec. 11, 2001

(65) Prior Publication Data
US 2002/0107787 A1    Aug. 8, 2002

Related U.S. Application Data

(60) Provisional application No. 60/254,571, filed on Dec. 11, 2000.

(51) Int. Cl.
G06Q 30/00      (2006.01)
G06F 17/30      (2006.01)
(52) U.S. Cl. ........................................ 705/14.4; 705/27
(58) Field of Classification Search ........................ None
See application file for complete search history.

(56) References Cited

U.S. PATENT DOCUMENTS 4,903,201 A * 2/1990 Wagner ........................ 705/37

| 5,592,375 | A | 1/1997 | Salmon et al. |
| 6,324,519 | B1 * | 11/2001 | Eldering ........................ 705/14 |
| 6,671,676 | B1 | 12/2003 | Shacham |
| 6,898,572 | B2 | 5/2005 | Ohyama |
| 6,937,996 | B1 | 8/2005 | Forsythe |
| 6,985,882 | B1 | 1/2006 | Del Sesto |
| 2001/0034696 | A1 | 10/2001 | McIntyre |
| 2002/0007308 | A1 | 1/2002 | Anderson et al. |
| 2002/0013757 | A1 | 1/2002 | Bykowsky et al. |
| 2002/0184093 | A1 | 12/2002 | Cherry et al. |
| 2003/0074303 | A1 | 4/2003 | Gould |
| 2005/0171897 | A1 | 8/2005 | Forsythe et al. |

OTHER PUBLICATIONS

Curran, James; Seaton, Jean. Power Without Responsibility: The Press and Broadcasting in Britain. Routledge. 1997. p. 189.*
Spot Runner: Easy TV Ads For Local Businesses, Web article, www.siliconbeat.com/entries/2006/01/11/spotrunner_easy_ tv, printed Jan. 25, 2006.

* cited by examiner

*Primary Examiner*—Jason M Borlinghaus
(74) *Attorney, Agent, or Firm*—Cohen Pontani Lieberman & Pavane LLP

(57) ABSTRACT

A system for trading media space includes a server node which receives requests for media space from buyers and offers of media space from sellers. The server node includes a set of rules for matching one of the requests and one of the offers to form a matched request and offer pair. A delivery system is connected to said server node for facilitating delivery of media content between the buyer and seller of the matched pair.

42 Claims, 3 Drawing Sheets

METHOD AND SYSTEM FOR FACILITATING TRADING OF MEDIA SPACE

RELATED APPLICATIONS

This application claims priority from U.S. Provisional Patent Application Ser. No. 60/254,571 which was filed on Dec. 11, 2000.

BACKGROUND OF THE INVENTION

1. Field of the Invention

The present invention relates to trading of media space and, more specifically, to an online system for trading advertisements.

2. Description of the Related Art

Historically, revenues generated from selling media space for advertising have represented an important source of income for media companies. Television and radio stations as well as many Web sites rely almost exclusively on advertising revenue to fund the cost of their operations so that they may provide programming and content free of charge to the general public. Similarly, general-interest newspapers and magazines depend on advertising revenues to subsidize their cost of operations, allowing them to offer their publications to the public at low prices or free of charge.

In recent years, the forums for advertising have become as creative as they are ubiquitous: from banners on the sides of buses to stickers on peels of fruit. Advertising now represents a key component of many economies. For example, in the U.S., advertising expenditures represented 2.2% of the 1999 GDP; this figure is predicted to rise to 3% by 2010.

Currently, there are four primary models or arrangements under which traditional media space (i.e., non-interactive) is traded. In a first arrangement, a corporation wishing to advertise hires the services of an advertising agency, which buys space directly from media firms on behalf of its client. According to a second arrangement, the advertising agency purchases ad space through third party agents, which act on behalf of the media firms. Less common than the first arrangement yet more common than the second is a third arrangement in which the advertiser negotiates and purchases media space directly from the media firms. Finally, the least common arrangement by which the advertiser negotiates and purchases media space from third party agents, which act on behalf of the media firms.

Existing systems and methods for buying and selling non-interactive media space are generally inefficient, in terms of time, human and capital resources employed. They are oftentimes ineffective in that they produce sub-optimal results or waste unsold inventory. The reasons for this relate to the fragmented structure of the industry: With thousands of geographically dispersed buyers and sellers, the customized nature of such transactions necessitates lengthy periods for contract negotiation and market discovery.

Related to this is the fact that the metrics by which traders determine the value of non interactive media space are of questionable statistical significance and can be a subject of dispute, thereby hindering the commoditization of media space and the efficiency of trading. Additionally, due to the inefficiencies described above, trading in noninteractive media is generally conducted well-before scheduled placement, relying on metrics that are dated and often inaccurate by the time the advertisements appear.

There have been attempts to provide technological solutions to facilitate more efficient and effective trading and placement of interactive media. A common prior art method collects information on the numbers and demographic characteristics of users of contracted interactive media sites, matches this information to user profiles, which the advertiser seeks to target, and then provides advertisements to the various sites. Another method aimed at traditional media typically offers advertisers access to an integrated catalogue listing product information from multiple sellers of media space. Others offer buyers software that helps automate advertising procurement, thereby reducing transaction costs. Yet none of these methods described provides an on-line exchange, which allows members to buy, sell and physically deliver media contents, in accordance with user-defined criteria.

Accordingly, there is a compelling need for the development of such a media exchange, which facilitates real-time demand and supply and pricing for media space, matches buyers and sellers according to defined metrics, and dynamically delivers the traded media contents.

SUMMARY OF THE INVENTION

An object of the present invention is to provide a method and system for facilitating flexible and efficient trading of media space.

A further object of the present invention is to provide a method and a system for facilitating delivery of media content on the basis of settled trades.

According to an embodiment of the present invention, the system provides sellers of media space access to multiple buyers of media space in one electronic marketplace, thereby allowing sellers to maximize the value of their unsold inventory.

According to another aspect of the invention, the system provides buyers of media space access to multiple sellers of media space in one electronic marketplace, thereby expanding the purchasing opportunities.

According to still another aspect of the invention, there is provided a single, integrated online environment for media research, planning, trading and content delivery.

An advantage of the present invention is that transaction costs associated with the buying and selling of media space for both buyers and sellers of media space are reduced. The media space contemplated for trading includes any space that may be offered by media such as, for example, television radio, newspaper, magazine, Internet, outdoor signage. The traded space is intended for placement of advertisement content and may include one or more of the following attributes:

Type of medium;
Unit of Trade;
Target Market;
Time Interval of Placement; and
Audience Characteristics (e.g., Ratings, Demographics).

Furthermore, the market participants may be any player participating in the media space trading market such as, for example, Advertisers, Advertising Agencies (i.e, Representatives of Advertisers), Media Space Owners, and Agents of Media Space Owners. Other participants may include other types of media space brokers, risk managers, and speculators.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless

DETAILED DESCRIPTION OF THE PRESENTLY PREFERRED EMBODIMENTS

Figure 1:
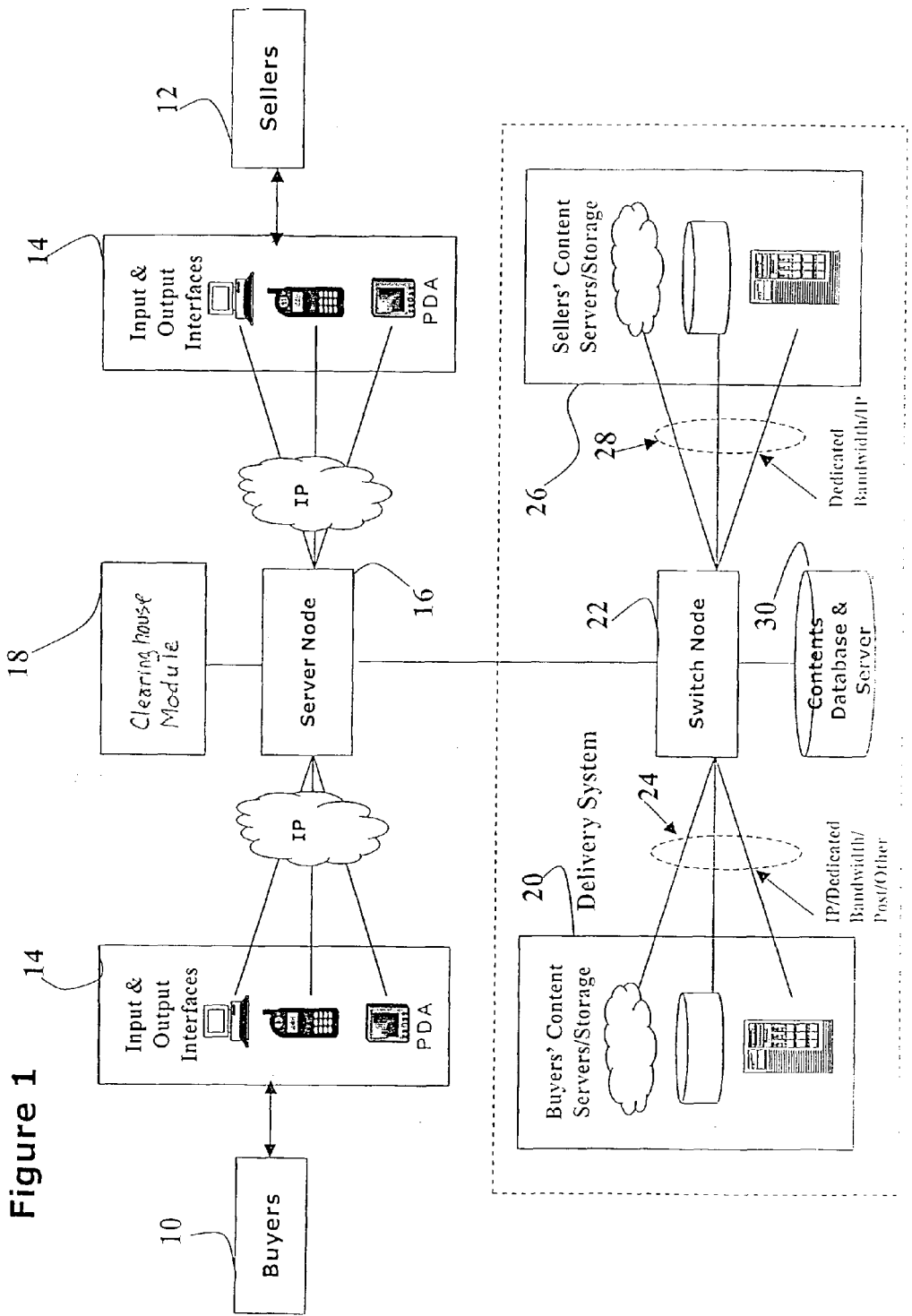
FIG. 1 is a block diagram depicting a preferred embodiment of the present invention.

FIG. 1 is a block diagram of a system for trading media space according to an embodiment of the present invention. Market participants such as, for example, buyers 10 of media space and sellers 12 of media space interact with a server node 16 of the system through an interface 14 which may, for example, comprise a computer, a cellular phone, a personal digital assistant (PDA), or any other device which is capable of communication with the server node 16. The interface 14 may communicate with the server node 16 via a private network or an IP network such as the Internet. The interface 14 includes an input channel such as a keyboard, electronic pen, voice recognition, or other input which allows the seller market participants to submit offers (i.e., asks) of media space the buyer market participants to submit requests (i.e., bids) for media space. The interface 14 also includes an output channel, such as a screen or a speaker for transmitting information regarding the status of the submissions to the participants.

Figure 2:
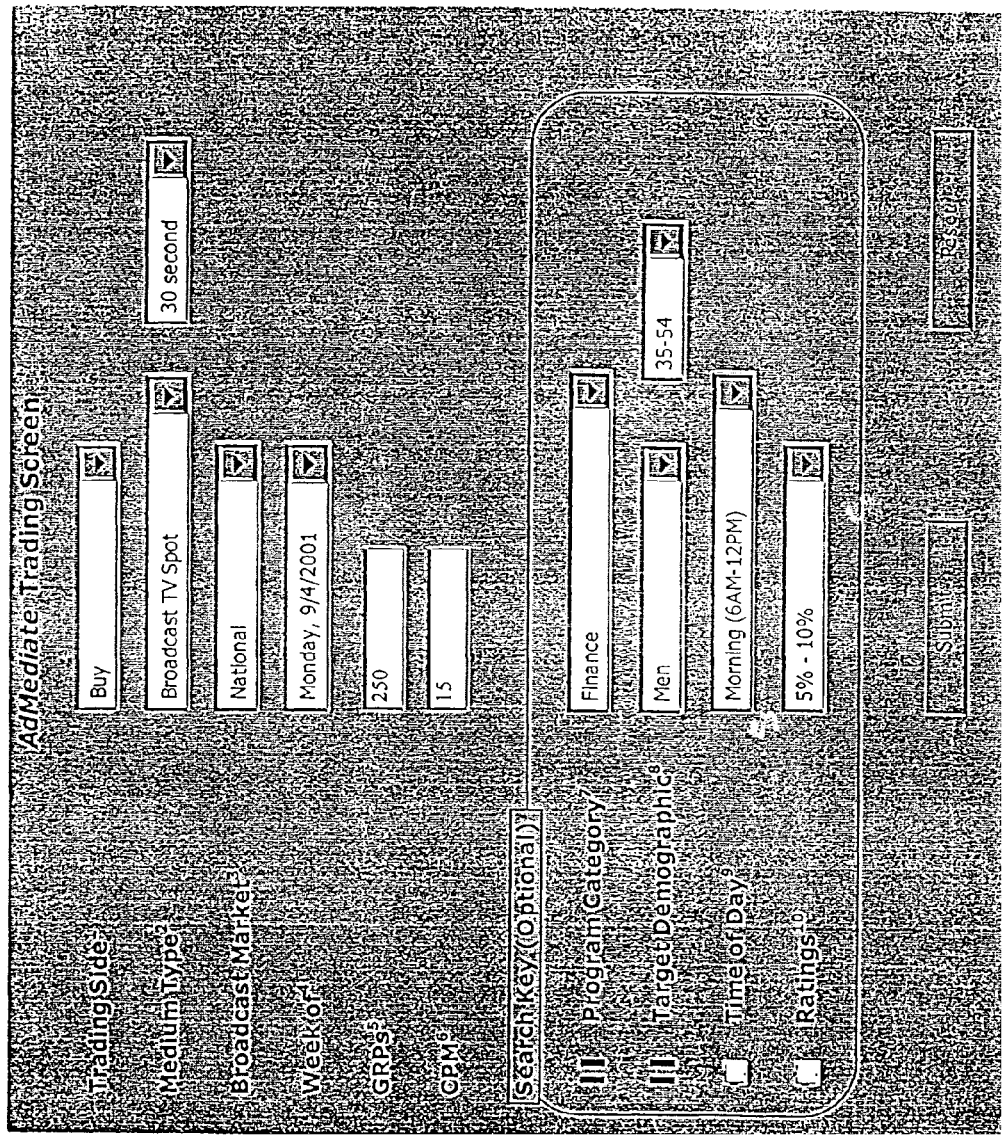
FIG. 2 is a schematic diagram of an input screen according to an embodiment of the invention.

FIG. 2 shows an example of an input screen which may be presented to a participant. The participant merely fills in the required information (discussed in more detail below) and submits the information to the server node 16.

Referring back to FIG. 1, the server node 16 receives and stores bid and ask information that is submitted by the participants which may, for example, include the type of media space to be traded, the unit of the trade, quantity of the unit, the target market of the media space, time interval of placement, expected or guaranteed audience characteristics, rate, content delivery information, and information regarding the market participant responsible for the bid and ask.

The server node 16 includes a set of rules 16a which includes requirements and procedures for participation in the electronic market such as, for example, the required method for submitting the offer and requests, deal making processes, deal execution criteria, and delivery options for delivery of the media from the advertiser to the media space owner. The bids and asks may be validated by the server node 16 using known authentication procedures. Submissions are entered into an active bid/ask database, the contents of which may be viewed by the participants. The server node 16 matches the bids and asks based on the parameters specified in the bids and asks which satisfy deal execution requirements set forth in the set of rules 16a. Confirmation of executed deals is sent to the participants and the deal information is recorded in a database.

A clearinghouse module 18 is linked to the server node 16 and performs clearing, settlement, billing and other related back office functions on behalf of the parties for each executed trade transaction.

The server node 16 also facilitates the delivery of the media content from the buyer of media space to the correspondingly matched seller of media space after execution of a trade between the two parties. In a preferred embodiment, buyers' content storage facilities 20 are connected to switch node 22 through a first connection 24 and sellers' content storage facilities 26 are connected to the switch node 22 through a second connection 28. A contents database and server 30 may also be connected to switch node 22. Connections 24 and 28 may, for example, comprise an IP network, an e-mail system, or other file transfer means. In a preferred embodiment, buyers desiring the system to facilitate automatic delivery of content upon execution of trades send the offered media content to switch node 22 which directs the received media content to the content's database and server 30. Upon execution of a trade, the server 16 instructs the switch node 22 to send the buyer's content from the content's database 30 to the correspondingly matched seller. In this alternative embodiment, the content of the advertisement from the buyer of media space is automatically delivered to the seller of media space upon completion of the trade. It is also possible for the seller to provide information to be stored in the content's database and server 30 before the match is made.

In a further embodiment, the system may inform the participants of the completed trade and provide information to the buyer which allows the buyer in the settled trade to directly send the content to the seller of the settled trade. In this embodiment, the system merely coordinates the transfer of content and does not actually perform the automatic delivery.

Figure 3:
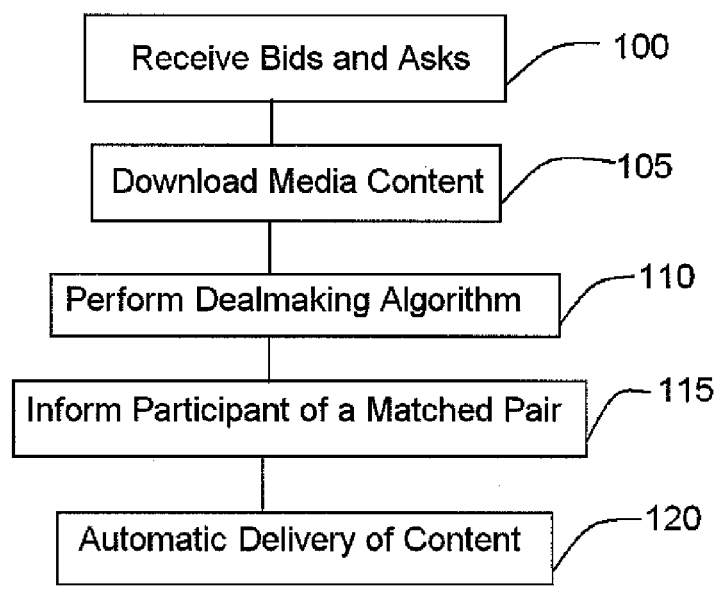
FIG. 3 is a flow diagram depicting the steps according to the method of the present invention.

FIG. 3 shows the method according to the present invention. The bids and asks are first received at the server node 16 in step 100. The content of the advertisement to be displayed in the media space is then downloaded from the buyer's content server to the contents database and server 30, step 105. The server node 16 performs deal making algorithm to match bids and asks, step 110. When a deal is made, the participants of the matched bid and ask are informed, step 115. The server node 16 signals the switch node 22 and the content of the advertisement for the matched request for media space is automatically transmitted to the sellers' content server from the contents database and server 30, step 120. The automatic delivery of the content allows the match to be a near-to-event transaction. That is, the match can be made in a spot market immediately prior to when the ad will be displayed.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A system for trading media space, comprising:
   a server node configured to connect to user interfaces for receiving requests for media space from buyers and offers for media space from sellers, said requests and offers being stored in a database of the server node, said requests including expected audience characteristics specified by the buyers and said offers comprising guaranteed audience characteristics specified by the sellers, wherein the expected and guaranteed audience characteristics define a target audience comprising a plurality of audience members, and the expected and guaranteed audience characteristics correspond to each member of the target audience;

said server node comprising a set of rules including a deal execution requirement for automatically matching the requests and offers stored in the database based on parameters specified in the requests and offers including the expected and guaranteed audience characteristics, and for executing at least one trade between a matched buyer and seller in accordance with the deal execution requirement; and said server node configured to facilitate delivery of media content, which corresponds to an offer stored in the database, between the matched buyer and seller in response to the at least one executed trade, wherein the media content is configured for delivery by the seller via the media space to the target audience corresponding to the expected and guaranteed audience characteristics.

2. The system of claim 1, wherein said server node is further configured for sending notice of the executed trade to the matched buyer and seller.

3. The system of claim 1, further comprising a delivery system having a switching node connected to said server node, a buyer's content database and a seller's content database, wherein the media content is delivered from the buyer's content database to the seller's content database via said switching node.

4. The system of claim 3, wherein said delivery system further comprises a third content database connected to the switching node and configured to store media content, the delivery system being configured to receive the media content from the buyers when the requests are submitted to the server node and to store the media content in the third content database, and the delivery system being configured to deliver the media content from the third content database to the one of the sellers of the matched pair via the switching node.

5. The system of claim 3, wherein said switching node is connected to said buyer's content database and said seller's content database via a file transfer means.

6. The system of claim 3, wherein said switching node is connected to said buyer content database and said seller content database via a file transfer means consisting of one of an IP network and e-mail system.

7. The system of claim 3, wherein said delivery system further comprises a third content database connected to the switching node, means for receiving the offered media content from the sellers when the offers are submitted to the server node and storing the offered media content in the contents database, and means for delivering the content media from the buyer to the seller of the matched pair at the switching node.

8. The system of claim 1, wherein said server node is connectable to the buyers and the sellers via a wide area communication network.

9. A method for trading media space, comprising the steps of:

receiving, at a server node, requests for media space from buyers and offers of media space from sellers, said requests including expected audience characteristics specified by the buyers and said offers comprising guaranteed audience characteristics specified by the sellers, wherein the expected and guaranteed audience characteristics define a target audience comprising a plurality of audience members, and the expected and guaranteed audience characteristics correspond to each member of the target audience;

storing the received requests and offers in a database of the server node;

matching, at the server node, the requests of the buyers and the offers of the sellers stored in the database based on parameters specified in the requests and offers including the expected and guaranteed audience characteristics;

executing, at the server node, a trade between a matched buyer and seller according to predetermined rules including a deal execution requirement; and facilitating, by the server node, delivery of media content between the matched buyer and the seller pursuant to the predetermined rules in response to the step of executing, wherein the media content is configured for delivery by the seller via the media space to the target audience corresponding to the expected and guaranteed audience characteristics.

10. The method of claim 9, wherein a switching node is connected to the server node and said method further comprises the step of sending the media content from a first database of the buyer to a second database of the seller via the switching node.

11. The method of claim 10, wherein a third content database configured to store media content is connected directly to the switching node and the first and second databases are connected to the switching node via a file transfer means consisting of one of an IP network and e-mail system, and said method includes the steps of downloading the media content from the first database to the third content database when the request is transmitted to said server node and automatically sending the media content from the third content database to the second database after said step of executing.

12. A computer-readable medium encoded with instructions for trading media space, which when executed by a computer, causes the computer to perform a method comprising:

receiving, at a server node, requests for media space from buyers and offers for media space from sellers, the requests including expected audience characteristics specified by the buyers and the offers comprising guaranteed audience characteristics specified by the sellers, wherein the expected and guaranteed audience characteristics define a target audience comprising a plurality of audience members, and the expected and guaranteed audience characteristics correspond to each member of the target audience;

storing the received requests and offers in a database of the server node, matching a request of one of the buyers stored in the database and an offer of one of the sellers stored in the database at the server node that satisfy a deal execution requirement to form a matched pair based on parameters specified in the requests and offers including the expected and guaranteed audience characteristics, executing, at the server node, a trade between the buyer and the seller, and facilitating delivery of the media content between the matched buyer and seller for delivery of the media content, wherein the media content is configured for delivery by the seller via the media space to the target audience corresponding to the expected and guaranteed audience characteristics.

13. The computer-readable medium of claim 12, further comprising delivering the media content from a first database to a second database via a switching node connected to the server node.

14. The computer-readable medium of claim 13, further comprising downloading the media content from the first database to a third content database connected to said switching node when the request is transmitted to said server node and automatically sending the media content from the third content database to the second database after the trade is executed between the buyer and the seller.

15. The system of claim 1, further comprising a clearinghouse module connected to said server node configured to perform one of clearing, settlement and billing for the executed trade.

16. The system of claim 1, wherein the media space is an ad space on one of television, radio, newspaper, magazine, Internet, and outdoor signage.

17. The system of claim 1, wherein the media space includes attributes comprising at least one of type of medium, unit of trade, target market, time interval of placement, and audience characteristics.

18. The system of claim 1, wherein the buyers and the sellers are market participants, wherein the market participants comprise at least one of an advertiser, a representative of advertisers, a media space owner, an agent of media space owners, a media space broker, a risk manager or a speculator.

19. The system of claim 1, wherein the server node is configured to present an input screen to buyers and sellers for the request and the offer.

20. The system of claim 1, further comprising an interface through which the buyers and sellers interact with said server node, said interface comprising at least one of a computer, a cell phone, and a personal digital assistant.

21. The method of claim 9, further comprising the step of coordinating, by the server node, the delivery of the media content between the buyer and the seller.

22. The method of claim 9, further comprising one of clearing, settling and billing for the executed trade using a clearinghouse module.

23. The method of claim 9, wherein the media space is an ad space on one of television, radio, newspaper, magazine, Internet, and outdoor signage.

24. The method of claim 9, wherein the media space includes attributes comprising at least one of type of medium, unit of trade, target market, time interval of placement, and audience characteristics.

25. The method of claim 9, wherein the buyers and the sellers are market participants, wherein the market participants comprise at least one of an advertiser, a representative of advertisers, a media space owner, an agent of media space owners, a media space broker, a risk manager or a speculator.

26. The method of claim 9, wherein the server node presents an input screen to the buyers and sellers for the request and the offer.

27. The method of claim 9, wherein each of the buyers and the sellers interact with the server node using an interface comprising at least one of a computer, a cell phone, and a personal digital assistant.

28. The computer-readable medium of claim 12, further comprising performing one of clearing, settling and billing for the executed trade.

29. The computer-readable medium of claim 12, further comprising performing the step of coordinating, by the server node, the delivery of the media content between the buyer and the seller.

30. The computer-readable medium of claim 12, wherein the media space is an ad space on one of television, radio, newspaper, magazine, Internet, and outdoor signage.

31. The computer-readable medium of claim 12, wherein the media space includes attributes comprising at least one of type of medium, unit of trade, target market, time interval of placement, and audience characteristics.

32. The computer-readable medium of claim 12, wherein the buyer and the seller are market participants, wherein the market participants comprise at least one of an advertiser, a representative of advertisers, a media space owner, an agent of media space owners, a media space broker, a risk manager or a speculator.

33. The computer-readable medium of claim 12, wherein the server node presents an input screen to the buyers and sellers for the requests and the offers.

34. The computer-readable medium of claim 12, wherein each of the buyers and the sellers interact with the server node using an interface comprising at least one of a computer, a cell phone, and a personal digital assistant.

35. The system of claim 1, wherein each of said requests and offers comprise parameters and the deal execution requirement of said set of rule automatically matches the requests and offers stored in the database based on at least one of the parameters that is different from a cost of the media space.

36. The method of claim 9, wherein each of the requests and offers comprise parameters and the deal execution requirement of the set of rule automatically matches the requests and offers stored in the database based on at least one of the parameters that is different from a cost of the media space.

37. The computer-readable medium of claim 12, wherein each of the requests and offers comprise parameters and the deal execution requirement of the set of rule automatically matches the requests and offers stored in the database based on at least one of the parameters that is different from a cost of the media space.

38. The method of claim 9, further comprising validating at least one of the requests and the offers.

39. The method of claim 38, wherein the at least one of the requests and the offers is validated by the server node.

40. The system of claim 1, wherein the audience characteristics include at least one of gender, age, time, rating, and program category.

41. The system of claim 9, wherein the audience characteristics include at least one of gender, age, time, rating, and program category.

42. The computer-readable medium of claim 12, wherein the audience characteristics include at least one of gender, age, time, rating, and program category.

* * * * *